Jan. 14, 1930.  W. G. JOHNSON  1,743,143
CASTER
Filed May 12, 1926
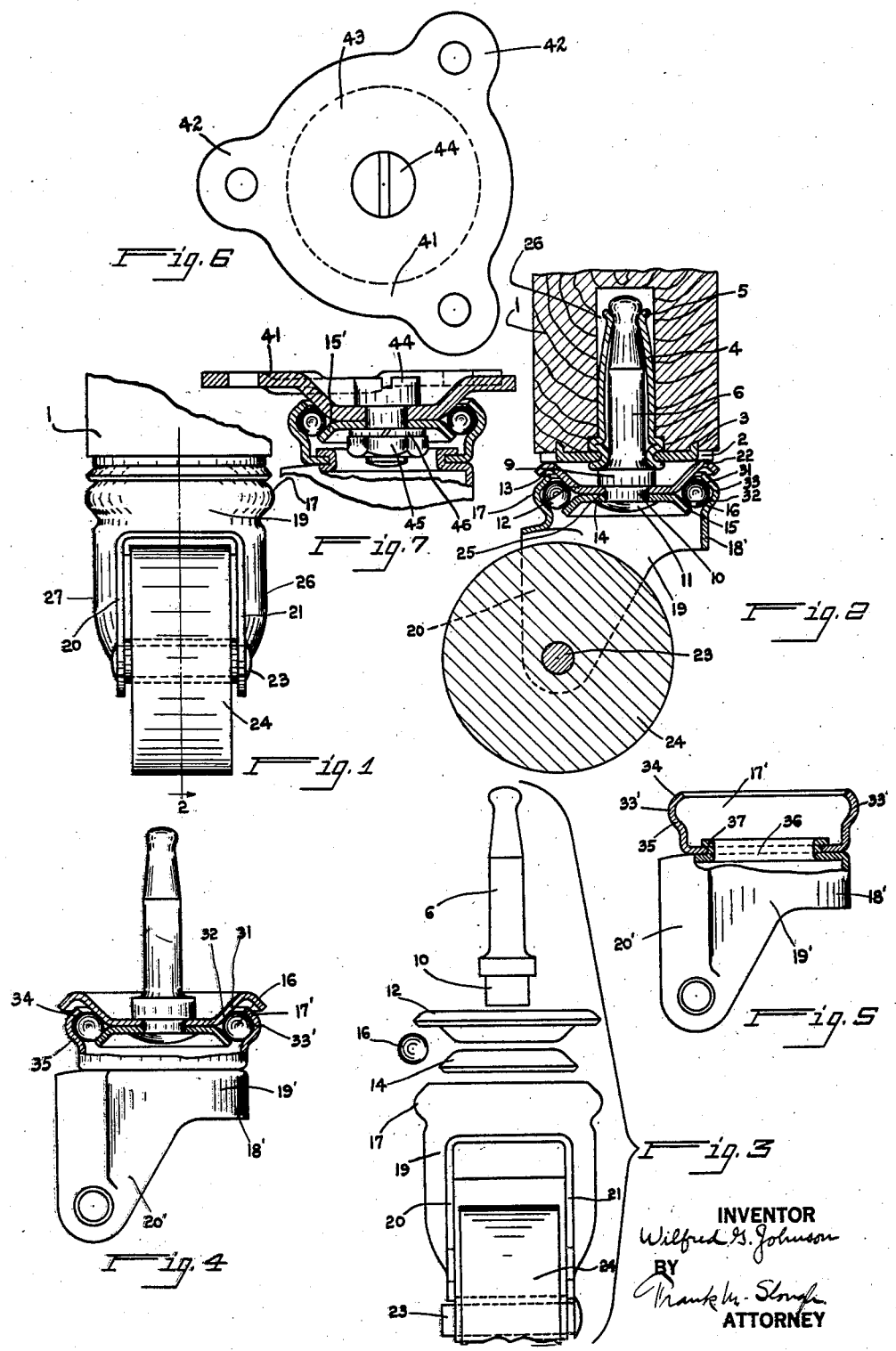
INVENTOR
Wilfred G. Johnson
BY
Franklin M. Slough
ATTORNEY Patented Jan. 14, 1930

1,743,143

UNITED STATES PATENT OFFICE

WILFRED G. JOHNSON, OF ELYRIA, OHIO, ASSIGNOR TO THE COLSON COMPANY, OF ELYRIA, OHIO, A CORPORATION OF OHIO

CASTER

Application filed May 12, 1926. Serial No. 108,536.

My invention relates to casters and relates more particularly to an improved form of ball bearing caster.

One of the objects of my invention is to provide a caster in which friction of the moving parts is reduced to a minimum.

Another object of my invention is to accomplish the swivelling of an improved form of caster without rotating the portions thereof which are provided for securing the caster to an article to be supported.

Another object of my invention is to provide an improved caster which is durable in construction, inexpensive to manufacture and easily and quickly assembled from a minimum number of parts.

Another object of my invention is to provide an improved form of caster wherein dust will not readily enter the bearings.

Other objects of my invention and the invention itself will be apparent by reference to the accompanying description of embodiments thereof, and which embodiments are illustrated in the accompanying drawings wherein:

Fig. 1 is an elevational view covering an improved caster embodying my invention as applied to a caster receiving socket;

Fig. 2 is a vertical sectional view on the line 2—2 of Fig. 1;

Fig. 3 shows the parts of the caster of Figs. 1 and 2 unassembled;

Fig. 4 shows a side elevation, partly in section, of a modification of the embodiment of my invention shown in Fig. 1;

Fig. 5 shows a sectional view of the yoke of the caster of Fig. 4; and

Figs. 6 and 7 show a plan and a vertical medial cross section of another embodiment of my invention, the lower fragment of the caster being shown in the latter as broken away.

Referring to the drawings, wherein like reference characters designate like parts, at 1, I show a base portion of a piece of furniture having a caster receiving recess 26. A gripping plate 2, secured in any suitable manner, as by prongs 3, supports the tubular spring retaining socket 4 which extends into the recess 26 and which socket is provided with spring ends 5 which resiliently retain the caster stem 6 in the socket. The spring ends are adapted to snap into the annular groove formed near the end of the stem.

The lower end of the stem, enlarged at 9, is reduced in cross section at 10, the end of which is adapted to be upset as at 11 when the caster is assembled to rigidly retain on the stem a pair of oppositely dished abutting ball bearing retaining disks 12 and 14 having bearing race surfaces at 31 and 32 on annular flanges of the disks. The upper disk 12 comprises a peripheral depending side flange 13.

Supported by the axle 23, I provide a bifurcated caster yoke 19, the upper end of which comprises an integral reenforcing portion skirt 18 extending around three of its sides; a race flange portion 17 extends upwardly from the yoke. Interposed between the disks 12 and 14 and the flange 17 are disposed a plurality of bearing balls 16 embraced by the adjacent face of the flange races 31 and 32.

Depending from the yoke 19 are a pair of forks 20 and 21 which are convexly curved at 26 and 27; the flat forward portion of the forks are preferably parallel with a roller wheel 24 carried thereby, secured to the ends of an axle 23, which contacts with the ground or floor and supports the caster and furniture.

Referring to Fig. 3 of the drawings, I have illustrated my caster disassembled. The reduced portion 10, of the stem, is inserted into and projects through central openings 25 in the disks. The yoke, disks, and the bearing balls are then assembled as illustrated in Fig. 2 of the drawings, the projecting portion 10, then being upset riveting the disks rigidly together. The balls positioned as illustrated in the races, non-frictionally connect the yoke and stem.

Reversely directed flanges of the disks 12 and 14 extend diagonally upward and downward, respectively, to form preferably plane bearing surfaces for the bearing balls, these bearing surfaces extending substantially at right angles to each other, and the opposing race 17 of the yoke is transversely curved at its mid-portion 33 wherein preferably no contact is had with the bearing balls and then on either side of the said mid-portion is less abruptly curved, or planular, for contact at two points with the row of bearing balls placed within the race. It will be noted that in the embodiment illustrated in Fig. 2, I have, for the purpose of illustration, shown the bearing surfaces of the race 17 disposed substantially at right angles each to the other, each being substantially planular, whereas in the similar race carried by the yoke in the embodiments of Figs. 4 and 5, the race 17' is transversely curved in its bearing portions, the degree of curvature, however, being preferably greatest at an intermediate non-bearing portion 33' and the transverse curvature of the race being less in the bearing portion 34 disposed above and the bearing portion 35 disposed below the said intermediate non-bearing race portion.

It will be seen that I have therefore provided in the caster of my invention a four-contact engagement between the bearing balls and the bearing races, the bearing races shown in Fig. 2 having substantially two pairs of oppositely disposed points of contact with the bearing balls, the bearing surfaces being substantially planular, whereas in the embodiment of Figs. 4 and 5, the bearing surfaces make like four-point contacts over a somewhat greater area in the case of the race 17', since the bearing surfaces thereof are transversely curved.

By so disposing the bearing balls and the bearing surfaces of the races and thereby placing the balls in a substantially quadrilateral of bearing surfaces, the quadrilateral in the embodiments illustrated being a square, in transverse cross sections, I provide for lateral thrusts and vertical thrusts in any direction, adapted to be imparted by the movement of the article of furniture over a surface upon which the wheels 24 may rest and may travel whenever the wheel is lifted by riding over obstructions, or whenever it is given a lateral impulse by striking against an obstruction placed in its path. This arrangement is superior to prior constructions, having only two points of contact between the bearing balls and the opposing races, and thus having three points of contact for various reasons, among which may be mentioned that where reliance is placed upon a two-point contact to withstand both vertical and lateral thrusts, and wedging action occurs between the balls and the races, friction is set up, whereas in a three-point contact sacrifice in efficiency for either vertical or lateral thrusts must inevitably have to be made.

I thus accomplish in a caster having but a single row of bearing balls, those advantages which heretofore have been only resident so far as I am aware in casters having a plurality of rows of bearing balls, and accomplish in my improved structure a rigidity of construction not usually had in casters possessing the advantages hereinabove set forth.

A caster comprising the parts illustrated and described in the drawings and specification and assembled in the manner set forth is capable of withstanding the rough usage encountered by casters of this type. The entrance of settling dust is reduced by the guarding over-hanging flange 13, which supports the weight of the furniture.

In the caster illustrated in Figs. 4 and 5, wherein I show a modified construction, at 19' I show a yoke having a reenforcing depending skirt portion 18' in its upper part, and comprising a pair of depending forks or prongs 20' secured at the ends of a supporting wheel axle. The yoke is perforated in its upper mid-portion at 36 and has an upstanding annular reversely turned flange 37 in its portions surrounding the perforation, the flange 37 being first formed as cylindrical and adapted to receive over its outer surface the cup 17', which cup is adapted to be seated upon the upper surface of the yoke. The bottom wall of the cup 17' has a central perforation adapted to receive the cylindrical flange 37, and after the cup 17' is fitted into place, the flange 37 is reversely turned at its upper rim to securely hold the cup 17' in place on the top of the yoke.

Although the form of the bearing race contained in the upper portion of the cup on its inner side may be that shown for the bearing race 17 of the embodiment illustrated in Figs. 1 and 2, I have herein shown in Figs. 4 and 5 a bearing race comprising an intermediate non-bearing portion 33' and bearing portions 34 and 35 disposed above and below, respectively, the said intermediate race portion. All of the race portions mentioned are transversely curved, but the intermediate portion is curved to a greater degree than the portions 34 and 35. Preferably, also, the bearing ball contacting portions of the race portions 34 and 35 are so disposed with reference to each other and to the bearing balls contacting with them, that lines drawn tangent to the points of engagement of the bearing balls and said bearing portions in a plane transverse to the bearing race will extend at substantially right angles each to the other.

By virtue of the convexly formed forks the caster parts may be made of pressed sheet steel. The forks are sufficiently reenforced by the convex curved portion to withstand heavy loads.

In Figs. 6 and 7, there is illustrated another embodiment of my invention similar to that of the foregoing embodiments but in which the caster stem is omitted, being replaced by a load-supporting plate 41, which contains laterally extending lug portions 42, each of which is perforated for the reception of a securing bolt, or the like, whereby the plate may be bolted or otherwise secured to the bottom of a piece of furniture. The intermediate portion of the plate 41 is recessed at 43, and the plates 41 and 15' are bolted together by means of a machine screw 44 passed through the axle perforations in the plates. A nut 45 and split washer 46 are placed on the other end of the screw. The plates may be secured together by a double headed rivet, or in any other suitable well-known way if desired.

Other relations may be chosen than those herein illustrated and described and still comprised within my invention, but those I have set forth I prefer and consider to be most efficient for the purposes intended.

Having thus described my invention in certain embodiments, I am aware that numerous and extensive departures may be made from the embodiments herein illustrated and described but without departing from the spirit of my invention.

I claim:

1. In a ball bearing caster, in combination with a yoke, a wheel rotatably supported by the yoke between its fork ends, said yoke comprising an intermediate upper portion of annular form having an annular concave race surface on its inner wall, a pair of metallic disks centrally secured together having diverging border portions, a plurality of bearing balls interposed between the race surfaces of the yoke intermediate portion and the diverging disk portions, the upper of said disks adapted to support a load and having a downturned peripheral portion disposed over and outside of an annular upper edge of the yoke.

2. In a ball bearing caster, a pair of concaved disks, means for securing the disks together by their central portions, said disks disposed thereon with their central portions adjacent to each other and their outer portions diverging at approximately right angles each to the other, a caster fork terminating at its upper intermediate portion in an annular ring, said ring having a concaved annular bearing race on its inner surface, bearing balls each disposed between diverging disk portions and the said ring race surface, the upper of said disks forming an upright cup and having an outwardly extending annular border projected over the upper edge of the said ring, the upper surface of the upper disk adjacent its said border adapted to be engaged by a lower surface of an article to be supported by said caster.

3. In a ball bearing caster, a caster wheel, a fork rotatably supporting the wheel, said fork comprising a yoke, a tubular sheet metal bearing element formed to have an annular concave bearing race surface on its inner wall, extending upwardly from the yoke, a single set of load supporting bearing balls, a pair of superposed sheet metal plates secured together in rigid engagement in relatively central portions, said plates extending outwardly divergingly from each other to form inclined outer bearing surfaces for said set of bearing balls, said annular race surface and the outer surfaces of the divergent portions of the plates providing an annular bearing race for the bearing balls interposed therebetween, said yoke being perforated and said tubular element having an inwardly extending flange, the tubular element being rigidly secured on the yoke by interlocking annular portions of the flange and the portions of the yoke bordering its perforation.

In testimony whereof I hereunto affix my signature this 16th day of April, 1926.

WILFRED G. JOHNSON.